Patented Aug. 25, 1942

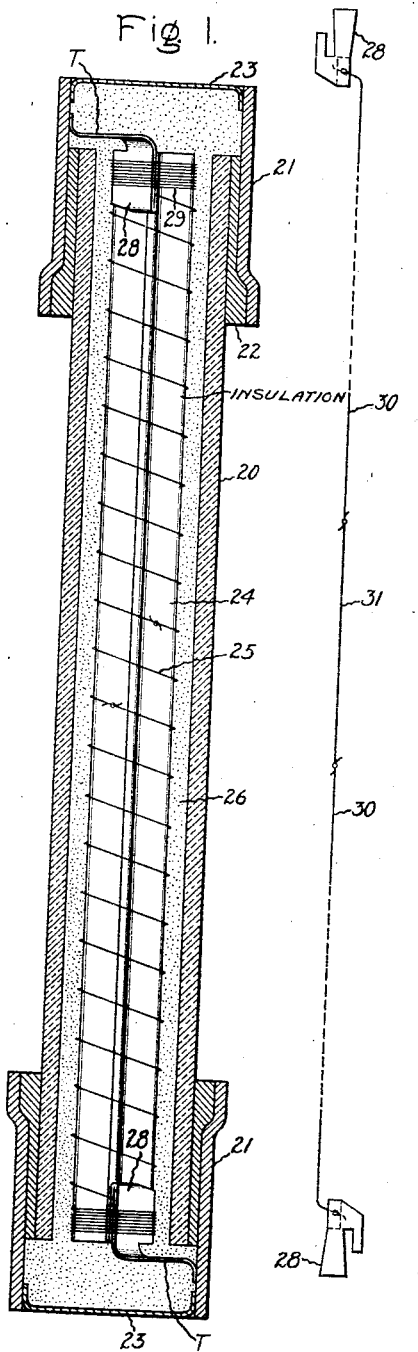
Aug. 25, 1942.   C. L. SCHUCK   2,294,132
ELECTRIC CIRCUIT INTERRUPTING DEVICE
Filed July 25, 1940   2 Sheets-Sheet 1
Inventor:
Carl L. Schuck,
by Harry E. Dunham
His Attorney.

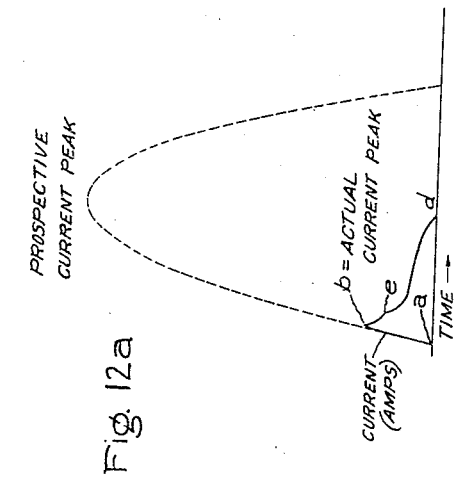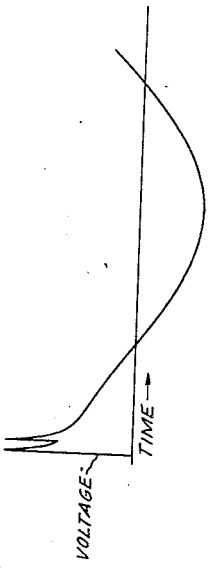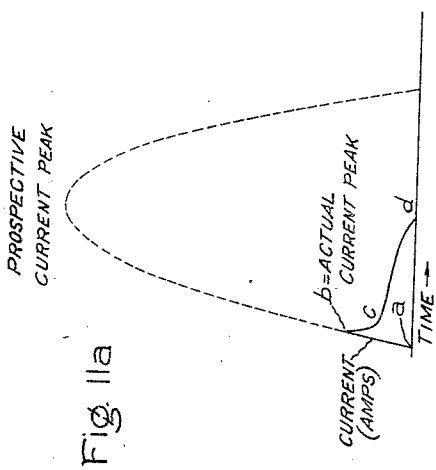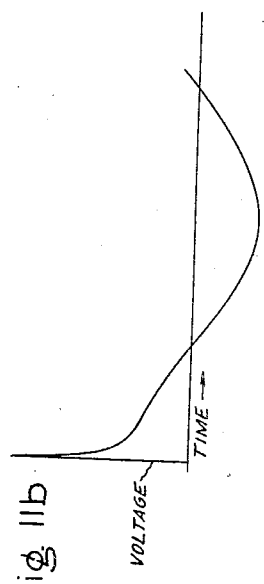

2,294,132

UNITED STATES PATENT OFFICE 2,294,132

ELECTRIC CIRCUIT INTERRUPTING DEVICE

Carl L. Schuck, Philadelphia, Pa., assignor to General Electric Company, a corporation of New York Application July 25, 1940, Serial No. 347,437

9 Claims. (Cl. 200—120)

The present invention relates to electric circuit interrupting devices, and more particularly to high voltage circuit interrupting devices of the current limiting type, embodying an interrupting element having a long fusible section which is embedded in an inert granular arc-quenching material and which fusible section is designed to fuse and dissipate ultimately throughout substantially the whole of its length upon subjection thereof to excess current of large magnitude, such as a severe short circuit current.

Interrupting devices of this character, if properly designed in accordance with presently known principles, are capable of exerting an extremely powerful current reducing and arc-quenching action so as to effect interruption of a severe overcurrent condition in a very short time, such as a half cycle at the latest in the case of alternating current. The term "current limiting" has been applied to these interrupting devices because of their ability to limit a short circuit current to an initial peak magnitude well below the peak magnitude of prospective current which an electric system, in which such interrupting device is connected, is capable of producing. By "prospective current," sometimes referred to as "available current," is meant the current which a given circuit would be capable of developing under like conditions if a link of negligible resistance, and sufficient heat capacity to survive at least a half cycle of current without melting, were employed in the place of the current limiting device.

Upon dissipation of the fusible section of a current limiting circuit interrupting device, there occurs an extremely rapid dispersion of the arc vapors and cooling of the arc, which has the effect of inserting a high resistance into the current path. Ultimate fusion and dissipation of the whole, or substantially the whole, of the length of the long fusible section is necessary in order that a sufficiently high value of resistance may be inserted to produce the desired current limiting action and rapid current interruption. However, it has been found that if all portions of the length of the fusible section dissipate instantly and simultaneously under severe overcurrent conditions, then there is danger of occurrence of an undesirably severe voltage surge, due to insertion of the maximum high value of resistance into the current path all at once with resultant violent and sudden changes from the conditions existing prior to initiation of the interrupting process.

In U. S. Patent No. 2,157,907, granted May 9, 1939, in the name of K. A. Lohausen and assigned to the same assignee as the present invention, the danger of such undesirable voltage surges are avoided by employment of an interrupting element wherein the fusible section, comprised of a single material, has a varying cross section. Thus, under severe overcurrent conditions there is secured a progressive or stepped dissipation of the fusible section so that the ultimate high value of resistance, corresponding to the whole length of the fusible section, is not inserted all at once into the current path.

The present invention also has for an object the provision of a current limiting circuit interrupting device, such as previously discussed, with a current interrupting element designed so as to secure relatively gradual or stepped insertion of resistance into the current path under severe over-current conditions. However, I attain this objective by provision of an interrupting element of improved construction such that progressive or step-by-step dissipation of the fusible section thereof is secured, in the main, by employment of materials of different electric resistivity respectively for different portions of the length of the fusible section. With respect to certain features, discussed in detail hereinafter, my improved current interrupting element has important advantages over an interrupting element constructed in accordance with the teachings of the Lohausen patent.

A further object of the present invention is the provision of an improved construction and arrangement of terminal means for a current interrupting element which is spirally wound on a ribbed insulating support as is common practice with circuit interrupting devices of the character hereinbefore discussed.

Other objects and the details of that which I consider to be novel and my present invention, will become apparent from the following description and the claims appended thereto, taken in conjunction with the accompanying drawings wherein:

Fig. 1 shows, in longitudinal section, an exemplary form of current limiting circuit interrupting device embodying my invention;

Figs. 2, 3 and 4 respectively show three exemplary forms of current interrupting element constructed in accordance with the invention;

Figs. 5 through 10 show details of construction of my improved terminal element, as well as successive steps in the connection of the terminal element and the manner of installing the same on an insulating supporting core;

Figs. 11a and 11b are diagrammatic representations for purposes of comparison, of oscillographic curves of current and voltage, respectively, illustrating conditions of circuit interruption as secured with a current limiting device wherein the current interrupting element is of a form old in the art in that it has a fusible section of uniform cross-section and the same material throughout its length;

Figs. 12a and 12b represent, diagrammatically, oscillographic curves of current and voltage, respectively, illustrating conditions of circuit interruption as secured with a current limiting circuit interrupting device embodying the present invention.

The interrupting device of the illustrated embodiment has a tubular enclosing casing 20 which is constructed of glass, porcelain, or other suitable insulating material. Metallic terminal ferrules 21 are secured respectively on the opposite ends of the casing by means of any suitable form of glass-to-metal seal, indicated at 22. The ends of ferrules 21 are closed by caps 23, sealed in place, although if desired the caps may be made integrally with the ferrules. An elongated insulating support or core 24, comprised of high heat resisting ceramic or other suitable material, extends longitudinally in the casing. This core serves to support a current interrupting element 25 which is spirally wound on the core and which may be of any of the improved constructions illustrated in Figs. 2, 3 and 4, described in detail hereinafter. Although the current interrupting element of the illustrated device comprises only a single conductor, it is common in the construction of such current limiting devices to employ one or more main conductors, depending upon the current rating. This is for the reason that it has been found that most effective current limiting action is produced when conductors of very thin cross-section are employed. Hence, where the current rating demands a relatively large total cross-section, it is desirable to divide this total cross-section into a number of parallel connected conductors having thin cross-section, such as a plurality of fine wires. The interior of casing 20 around core 24 is filled with an inert granular arc-quenching material 26, such as sand or pulverized quartz, which embeds the current interrupting element. As will be seen from the end view of Fig. 10, core 24 is of generally star-shaped form, in that it has a plurality of longitudinally extending fins or ribs, one of which is designated 27 for ease in later description. Although the illustrated core has four such fins, a core having more than four fins may be employed, depending upon the rating and size of the particular fuse. The advantage of a star-shaped core is that the current interrupting element touches the core only at spaced points so that the maximum length of the element is exposed to the filler material. Spirally winding the interrupting element on a core permits the installation of an element of relatively great length in a casing of practical dimensions.

The opposite ends of interrupting element 25 are secured to terminal elements 28 of improved construction, which are disposed respectively at opposite ends of core 24. Each of these terminal elements is comprised of a thin copper strip which, though flexible, has sufficient stiffness that it tends to retain its shape after it is bent to the desired form. The details of construction and manner of installing one of the terminal elements is illustrated in Figs. 5 through 10. One end of interrupting element 25 is placed between the body portion M of the terminal element and a tab N which is folded over on the line n so as to place metal on opposite sides of the interrupting element, as shown in Fig. 6. The end of the interrupting element then is secured between the two parts of the terminal element by welding as indicated at w, the interrupting element being protected against burning by the metal on opposite sides thereof. In installing the terminal element on the end of core 24, the body portion M is placed on the near side of one of the ribs or fins, such as that designated 27, as indicated in Fig. 7. The laterally extending portion of the terminal element then is folded along lines o and p so that portion O of the element lies along the longitudinal edge of the fin while portion P bears against the back of the fin as shown in Figs. 8 and 10. Completion of the installation is effected by folding the upwardly projecting short tab along lines r and s so that portion R bears against the upper end of fin 27, while portion S is folded down in front of fin 27 and behind the body portion M of the terminal element, as shown in Figs. 9 and 10. Thus the end of interrupting element 25 is securely anchored against unwinding, and also against movement toward the other end of the core which would produce collapse of the spiral. If it is desired still more securely to anchor the terminal element and the end of the interrupting element, a wire 29 may be tightly wrapped around the end of the core and over the terminal element, as shown in Fig. 1. The assembly of the core, interrupting element and terminal element may be installed as a unit in casing 20. In the final assembly of the fuse, the end of the upwardly projecting large tab T of each of the terminal elements is welded or soldered to the inside surface of the respectively adjacent one of the terminal ferrules 21. My improved single part terminal element thus provides a very simple and inexpensive means for anchoring and effecting electric connection of the current interrupting element.

In order to insure a proper understanding of the present invention, with respect particularly to my improved form of current interrupting element, it is believed advisable, for comparative purposes, to describe the operation of a current limiting circuit interrupting device employing a heretofore common form of fusible element which is of the same material, such as silver, and of uniform cross-section, throughout its length. This operation is best explained by reference to Fig. 11(a) which represents an oscillographic curve of short circuit current interruption by means of a current limiting fuse device having such heretofore common form of fusible element. The short circuit, and over heating of the silver conductor, begin at a. Substantially simultaneous dissipation of all portions of the effective fusible length of the conductor, and initiation of arcing, take place at point b. The current is finally interrupted at d. The broken lines indicate the manner in which the prospective or available current would develop under short circuit conditions if the fuse device were not connected in the circuit. Thus, a prospective short circuit current of, say, 60,000 R. M. S. amperes may be limited to a maximum peak value of between 200 and 20,000 amperes, depending on the fuse size, the current being prevented from rising above the value, indicated at b, which is required to melt and volatilize the conductor.

When the conductor volatilizes at b, the metallic vapors are dispersed extremely rapidly through the spaces between the relatively cool granules of the surrounding filling material, and condense on the surfaces of the granules, so that the vapors no longer are available for current conduction. Also, the intimate physical contact between the hot arc and the cool granules causes an exceedingly rapid transfer of heat from the arc to the filling material. Most of the arc energy is dissipated in this heat transfer and the pressure generated in the fuse is practically negligible. The substantially simultaneous volatilization of all portions of the effective fusible length of the conductor, the sudden removal of the metallic vapors from the arc path, and the extremely rapid cooling of the arc, have the effect of suddenly inserting an extremely high resistance into the current path, which causes the current to decrease precipitously from $b$ to some point such as that designated $c$. Final interruption of the current is accomplished with minimum disturbance, and takes place within an extremely short period of time, which is a half cycle at the latest in the case of alternating current. The current limiting action, as just described, is produced under all conditions within the rating of the interrupting device, provided the magnitude of current required to melt and volatilize the fusible section is reached before attainment of the peak magnitude of prospective current. Obviously, a current limiting action could not be produced if the peak magnitude of prospective current is reached before attainment of the magnitude of current required to melt and volatilize the fusible section.

In the operation of current limiting fuse devices wherein the fusible section is of the same material and uniform cross-section throughout its length, as just described, the sudden insertion of substantially the maximum resistance and the resultant precipitous current decay from point $b$ to point $c$, creates a voltage surge, as indicated in Fig. 11($b$). The magnitude of such surge is a function of the current at the instant of melting, the ohmic value of the resistance inserted and the constants of the circuit. Under some conditions, this surge voltage may rise to a crest value which is undesirably high and which may be above the established impulse insulation levels of connected apparatus.

In order to insure against undesirably high crest magnitudes of surge voltage, I provide a current interrupting element of improved construction. As exemplary of this improved construction, the current interrupting element of Fig. 2 comprises two relatively long conductors 30 connected by a relatively short conductive insert 31 which is joined to conductors 30 by soldering or other suitable means, and which insert is comprised of a material having substantially higher specific resistance than the material of which conductors 30 are comprised. The lengths, and the relation between the lengths, of the individual conductors, vary in accordance with current and voltage ratings. For example, the insert conductor 31 may have a length in the neighborhood of 2 or 3 inches while conductors 30 have various lengths such as to produce an overall length of current interrupting element varying from around 10 to around 60 or more inches for a voltage range of 2500 volts to 23,000 volts. Conductors 30 are in the form of fine silver wires, having a diameter in the neighborhood of .004 to .005 inch, although they may be of any other suitable form and material in accordance with known principles for construction of current limiting circuit interrupting devices. Insert 31 also is in the form of a fine wire which, in the embodiment of Fig. 2, has approximately the same cross-section as the wires 30. This insert is comprised of a material having an electric resistivity substantially higher than that of silver, and which material also has a high positive temperature co-efficient of resistance. Although any suitable material having these desired characteristics may be employed, I have found that a good material for the purpose is a nickel-chromium-iron alloy known by the trade name "Hytemco." The outer ends of wires 30 are joined respectively to terminal parts 28, hereinbefore described, and insert 31 preferably is so arranged that, when the interrupting element is wound on core 24, the insert is disposed approximately midway of the length of the core.

The manner of interruption of a severe short-circuit by a current limiting device employing an interrupting element constructed as shown in Fig. 2, is best explained by reference to Fig. 12($a$), wherein the solid line indicates the actual current conditions and the broken line indicates the current conditions which would exist if the current limiting device were not connected in the circuit. The short-circuit and overheating of the interrupting element begin at $a$. It will be noted that the actual current rise does not exactly follow the broken line since the insert 31, due to its high positive temperature coefficient of resistance, produces some current reduction before fusion occurs. The high resistance insert fuses and volatilizes at $b$, prior to volatilization of the end conductors 30, and arcing is initiated at $b$. Volatilization of insert 31 produces a considerable current limiting action, but the effective resistance initially inserted into the current path is not of as great magnitude as would be the case if the whole of the length of the interrupting element dissipated all at once. Dissipation of the end conductors takes place at point $e$ and the final stages of current interruption are represented by the portion of the curve $ed$. It will be seen, therefore, that in the case represented in Fig. 12($a$), the current reduction during the initial stage $be$ is not as precipitous and of as great magnitude as that occurring during the initial stage $bc$ in the case represented in Fig. 11($a$). Hence the initial current reduction, as represented in Fig. 12($a$), does not produce a voltage surge (see Fig. 12($b$)) of as high crest magnitude as that represented in Fig. 11($b$). By the time the end conductors 30 dissipate, the current has been reduced to a value indicated at $e$ so that the final stages of current reduction and interruption also do not produce a voltage surge of as high crest magnitude as that represented in Fig. 11($b$). Thus in the case represented in Fig. 12($b$), two voltage peaks are produced, but neither attains a crest magnitude as high as the single peak produced in the case represented in Fig. 11($b$).

In the current interrupting element of Fig. 2, the operation of which has just been described, the end conductors 30 and the insert conductor 31 are of substantially the same diameter, as previously pointed out. However, by proper selection of materials and dimensioning, similar desirable results may be obtained with an insert conductor which is smaller, or which is slightly larger, than the end conductors 30. In the construction of Fig. 3, there is employed an insert conductor which is of slightly smaller diameter than the end conductors. This has the effect, under severe overcurrent conditions of causing the insert to dissipate at a somewhat greater interval before dissipation of the end conductors than would be the case with the construction shown in Fig. 2. Otherwise, the operation of the interrupting element of Fig. 3 under severe overcurrent conditions, or short circuit, is substantially the same as previously described in connection with the construction of Fig. 2. Also, in Fig. 3, ceramic beads 33 are applied so as to surround relatively short spaced apart portions of insert 31. These beads function as thermal reservoirs on low current operation, in that they insulate the enclosed portions of insert 31 from the surrounding granular material and tend to retain the heat. This insures proper operation of the fuse on extremely low overloads. Low currents cause the insert conductor to melt within the thermal chambers. The resultant arcing then burns back the insert conductor and portions of the end conductors at a rate which is dependent upon the current magnitude. On extremely low currents, the final current interruption may require several cycles before a gap of sufficient length to interrupt the circuit is produced, and such gap may be produced before dissipation of the whole of the effective length of the current interrupting element.

In order to provide a still further reduction in crest magnitude of voltage surge on short-circuit current interruption, the construction illustrated in Fig. 4 may be employed. In this case the silver conductor 30, at one end of the interrupting element, and the insert conductor 31 of high specific resistance material, have substantially the same diameter, but the other silver conductor, designated 34, is of somewhat larger diameter than conductors 30 and 31. In the interruption of severe overcurrent with this form of interrupting element, insert 31 is dissipated initially so as to produce an initial current reduction somewhat similar to that indicated at $be$ in Fig. 12(a). Then conductor 30, being of smaller diameter than conductor 34, dissipates so as to cause a second stage of current reduction. Finally, conductor 34 dissipates and the final stages of current reduction and interruption take place. In this case the three successive stages of current reduction produce three voltage peaks but none of these voltage peaks attains a crest magnitude as high as that represented in Fig. 11(b).

With each of the improved constructions previously described, the whole of the interruption process under short circuit conditions takes place in an extremely short period of time which, as previously indicated, does not exceed a half cycle in the case of alternating current, and the interrupting element dissipates ultimately throughout the whole of its effective length so as to insert the high value of resistance required for proper current interruption. However, the relatively retarded insertion of the maximum high value of resistance, due to the progressive or stepped dissipation of the fusible section, insures that the crest magnitude of any voltage surge which may be produced will be substantially lower than the voltage surge crest which would be produced with a current interrupting element comprised of a single material and having uniform cross-section throughout its length.

Current interrupting elements constructed in accordance with the present invention also have important advantages over current interrupting elements comprised of a single metal but having varying cross-section as disclosed in the Lohausen patent previously referred to. The construction described in the Lohausen patent is basically sound for attainment of the desired progressive or stepped dissipation, and is entirely satisfactory for certain conditions and current ratings. However, with an interrupting element comprised of a single material and having varying cross-section, the smaller cross-section portions necessarily have less tensile strength than the larger cross-section portions. This presents practical difficulties where it is desired to employ extremely fine conductors. For example, in order to secure certain operational characteristics, it may be desired to employ the smallest conductor size which is practical from the standpoint of strength and manufacturing considerations. If the smallest practical conductor size is employed for the larger cross-section portions of the single-material varying-cross-section form of interrupting element, then there is danger of mechanical breakage of the relatively weaker smaller cross-section portion. On the other hand, if a conductor size providing the required strength is employed for the reduced portion of a single-material varying-cross-section interrupting element, then, in order to secure the desired relative difference in cross-section, it may be necessary to employ for the remainder of the interrupting element a conductor size which is larger than desired from an operational standpoint. Moreover, manufacturing difficulties may be encountered in the construction of single-material varying-cross-section conductors when the conductors are of very small size, such as of the order of the diameters previously mentioned herein.

With interrupting elements constructed in accordance with the present invention, the above mentioned difficulties are avoided. Such improved elements are relatively easy to manufacture, even where extremely small conductor sizes are involved. Employment of metals of different resistivity for different portions of the length of the interrupting element, makes it possible to secure the desired progressive or stepped dissipation with all portions of the length of the fusible section of approximately the same cross-section and tensile strength, as with the interrupting element illustrated in Fig. 2. Even with an interrupting element such as shown in Fig. 3, wherein the high resistance insert is of somewhat smaller diameter than the end conductors, any given degree of retardation of insertion of interrupting resistance can be secured with considerably less difference between the cross-sections of the smaller and larger diameter portions, than would be required with an interrupting element which is comprised of a single material and with which progressive dissipation is secured solely by reason of difference in cross-section. Also, the employment of a high specific resistance insert having a high positive temperature coefficient of resistance, has the advantage that it produces some retardation of the current rise even before fusion, as will be seen from Fig. 12(a). A still further advantage of the high specific resistance insert, from an operational standpoint, is that it makes possible a more predictable and effective interruption of low overload current.

What I claim as new and desire to secure by Letters Patent of the United States is:

1. In a high voltage circuit interrupting device of the current limiting type, a circuit interrupting element having a long fusible section comprised in the main of metal having good electric conductivity, which said fusible section is of thin cross-section and is designed to dissipate ultimately throughout substantially the whole of its length upon subjection of the fusible section to short circuit current, and a granular inert arc quenching material embedding substantially the whole of the length of said fusible section and capable of producing a current limiting action and extremely rapid current interruption upon dissipation of the fusible section by short circuit current, a relatively short portion of the length of said fusible section being designed to fuse and dissipate initially and prior to dissipation of the remainder of the fusible section upon subjection of the fusible section to short circuit current, said portion of the fusible section being comprised of metal having high resistance and a high positive temperature coefficient of resistance.

2. In a high voltage circuit interrupting device of the current limiting type, a circuit interrupting element including a long fusible section which has thin cross-section and which is comprised in the main of silver, said fusible section being designed to dissipate ultimately throughout substantially the whole of its length upon subjection of the fusible section to short circuit current, and a granular inert arc quenching material embedding substantially the whole of said fusible section and capable of producing a current limiting action and extremely rapid current interruption upon dissipation of the fusible section by short circuit current, a relatively short portion of the length of said fusible section being designed to fuse and dissipate prior to dissipation of the silver portion of the fusible section upon subjection of the fusible section to short circuit current, said portion being comprised of metal having substantially higher resistance than silver.

3. In a high voltage circuit interrupting device of the current limiting type, a circuit interrupting element having a fusible section designed to dissipate ultimately throughout substantially the whole of its length upon subjection of the fusible section to short circuit current, said section including within its length two relatively long silver wires of small cross-section and a relatively short conductive insert connected between and in series with said silver wires, said insert being comprised of metal having substantially higher resistance than silver and being designed to rupture prior to dissipation of said silver wires upon subjection of the fusible section to short circuit current, and a granular inert arc quenching material surrounding and embedding substantially the whole of the length of said fusible section.

4. In a high voltage circuit interrupting device of the current limiting type, a circuit interrupting element having a long fusible section designed to dissipate ultimately throughout substantially the whole of its length upon subjection of the fusible section to short circuit current, and a granular inert arc quenching material surrounding and embedding substantially the whole of the length of said fusible section, said section including within its length at least three fusible conductors of small cross section and connected in series relationship, the intermediate one of said conductors being designed to fuse and dissipate prior to dissipation of the other two of said conductors upon subjection of said fusible section to short circuit current, said intermediate conductor being comprised of metal having substantially higher resistance than the metal of said other two conductors, said other two conductors being comprised of metal having relatively good electric conductivity and said other two conductors respectively having different cross-sectional area.

5. In a circuit interrupting device including an insulating casing, terminal means including a metallic ferrule on one end of the casing, a longitudinally ribbed insulating support in the casing, and a circuit interrupting element including a conductor spirally wound on said support, connection means for said interrupting element including a metallic terminal piece joined to said conductor and disposed adjacent one end of said support, a part of said terminal being engaged with an end surface of said support and another part of the terminal piece being relatively sharply bent over a lateral edge of the support so as to anchor said conductor relative to the support, said terminal piece also having a part electrically and mechanically joined to said ferrule.

6. In a circuit interrupting device having an interrupting element including a conductor spirally wound on a longitudinally ribbed insulating support, connection means for said circuit interrupting element including a metallic terminal piece which is joined to said conductor and which has a part engaged with an end surface of one end of said support so as to prevent movement of the terminal piece toward the other end of the support, said terminal piece also having a part engaged with a longitudinally extending portion of a rib of the support in a manner positively to hold said conductor against unwinding.

7. In a circuit interrupting device having an interrupting element including a conductor spirally wound on an insulating support, which support has longitudinally extending ribs for maintaining the conductor in spaced relation to the central body portion of the support, connection means for said interrupting element including a metallic terminal piece joined to said conductor and disposed adjacent one end of said support, which said terminal piece has a part bent over the end of one of said ribs and another part bent relatively sharply around the longitudinal edge of said rib so as to anchor said conductor relative to the support.

8. In an electric circuit interrupting device, an insulating support having longitudinally extending fin-like projections, a circuit interrupting element including a conductor spirally wound on said support, and connection means for said element including a metallic terminal strip joined to an end portion of said conductor and disposed adjacent one end of said support, said strip being relatively sharply bent around the longitudinal edge of one of said projections, said end portion of the conductor being welded between two parts of said strip which are disposed on one side of said one projection, another part of said strip extending on the other side of said projection and having a tab bent over the end of said projection at said one end of the support, and said strip having also a tab-like extension for electric connection purposes.

9. In an electric circuit interrupting device, an insulating support having longitudinally extending fin-like projections, a circuit interrupting element including a conductor spirally wound on said support, connection means for said element including a metallic terminal strip joined to an end portion of said conductor and disposed adjacent one end of said support, which said strip has a part bent around the longitudinal edge of one of said projections and another part bent over the end of said one projection at said end of the support so as to anchor said conductor relative to the support, and a binding element tightly securing said terminal strip on the support.

CARL L. SCHUCK.